(12) United States Patent
Moulsley

(10) Patent No.: US 6,804,206 B1
(45) Date of Patent: Oct. 12, 2004

(54) RADIO COMMUNICATION SYSTEM

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/564,615

(22) Filed: May 4, 2000

(30) Foreign Application Priority Data

May 7, 1999 (GB) .............................................. 9910449

(51) Int. Cl.⁷ ............................................. H04B 7/216
(52) U.S. Cl. ...................... 370/320; 370/326; 370/328; 370/342
(58) Field of Search ................................ 370/312, 313, 370/314, 316, 322, 326, 328, 329, 331, 335, 336, 338, 310, 320, 342, 280, 294

(56) References Cited

U.S. PATENT DOCUMENTS

| | | | | |
|---|---|---|---|---|
| 5,673,259 A | * | 9/1997 | Quick, Jr. .................... | 370/342 |
| 5,883,887 A | * | 3/1999 | Take et al. ................... | 370/329 |
| 5,892,758 A | * | 4/1999 | Argyroudis .................. | 370/335 |
| 6,031,832 A | * | 2/2000 | Turina ......................... | 370/348 |
| 6,094,429 A | * | 7/2000 | Blanchette et al. .......... | 370/347 |
| 6,275,506 B1 | * | 8/2001 | Fazel et al. .................. | 370/478 |
| 6,339,612 B1 | * | 1/2002 | Stewart et al. .............. | 375/140 |
| 6,389,034 B1 | * | 5/2002 | Guo et al. ................... | 370/441 |
| 6,546,062 B1 | * | 4/2003 | Du et al. ..................... | 375/342 |
| 6,574,267 B1 | * | 6/2003 | Kanterakis et al. ......... | 375/141 |
| 6,606,314 B1 | * | 8/2003 | Bahenburg et al. ......... | 370/341 |
| 6,606,341 B1 | * | 8/2003 | Kanterakis et al. ......... | 375/130 |

* cited by examiner

Primary Examiner—Steven Nguyen
Assistant Examiner—Roberta Stevens
(74) Attorney, Agent, or Firm—Kevin Simons

(57) ABSTRACT

The invention relates to a radio communication system in which secondary stations (110) can request services from a primary station (100) using a random access channel employing a time division multiple access protocol, An access request comprises an access packet (200) having a predetermined maximum data capacity. If a secondary station requires to transmit an access request including more payload data (202,206) than can be accommodated in a single access packet the data is subdivided into a plurality of parts each of which is transmitted in a separate access packet. The primary station combines the data from the plurality of access packets (200) forming the access request, and issues an acknowledgement to the secondary station.

18 Claims, 2 Drawing Sheets

RADIO COMMUNICATION SYSTEM

The present invention relates to a radio communication system having a random access channel for transmission of an access request by a secondary station to a primary station, and further relates to primary and secondary stations for use in the system and to a method of operating the system. While the present specification describes a system with particular reference to the emerging Universal Mobile Telecommunication System (UMTS), it is to be understood that such techniques are equally applicable to use in other mobile radio systems.

In a radio communication system it is generally required to be able to exchange signalling messages between a Mobile Station (MS) and a Base Station (BS). Downlink signalling (from BS to MS) is usually realised by using a physical broadcast channel of the BS to address any MS in its coverage area. Since only one transmitter (the BS) uses this broadcast channel there is no access problem.

In contrast, uplink signalling (from MS to BS) requires more detailed considerations. If the MS already has an uplink channel assigned to it, for voice or data services, this signalling can be achieved by piggy-backing, in which the signalling messages are attached to data packets being sent from the MS to the BS. However, if there is no uplink channel assigned to the MS piggy-backing is not possible. In this case a fast uplink signalling mechanism may be available for the establishment, or re-establishment, of a new uplink channel.

In many systems, for example those operating to the Global System for Mobile communication (GSM) standard and in the proposed UMTS standard, fast uplink signalling is enabled by the provision of a random access channel using a slotted ALOHA or similar protocol. A MS wishing to request a particular service from, or transmit a short message to, its BS transmits an access request on the random access channel, which request includes information identifying the MS together with data relating to the requested service or message (this data often being referred to as payload data). If the BS receives the access request successfully, it transmits an acknowledgement to the MS. If any further negotiation is required to set up a requested service this is normally done on a new channel, identified in the acknowledgement.

The present invention is concerned with the implementation of a random access channel operating with a Time Division Multiple Access (TDMA) protocol in which transmissions are required to take place in time slots having a predetermined duration. A MS selects one such time slot in which to transmit its access request. A major consideration in the implementation of such a scheme is the need to ensure sufficient capacity for the anticipated traffic load. A particular problem in the implementation of an effective scheme is that there are a number of different uses for the random access channel, each requiring a different amount of payload data to be transmitted to the BS. If the length of the time slots is made sufficient to cater for all possible applications the capacity of the random access channel may be unacceptably reduced. On the other hand, if the length of the time slots is set to provide adequate channel capacity, initiation of services requiring larger amounts of payload data than can be accommodated in an access request becomes unnecessarily complex.

In a Code Division Multiple Access (CDMA) system like UMTS the capacity of the access packet is limited by the minimum spreading factor available. In addition, the spreading factor may impose a limit on maximum communication range. This means that the maximum capacity may be reduced in large cells (or at least for the case of a MS near the cell boundary).

An object of the present invention is to address the problem of maximising the capacity of a random access channel.

According to a first aspect of the present invention there is provided a radio communication system comprising a primary station and a plurality of secondary stations, the system having a random access channel for transmission of an access request by a secondary station to a primary station, which access request comprises an access packet having a predetermined maximum data capacity, wherein a secondary station requiring to transmit an access request including more payload data than can be accommodated in the format of a single access packet has means for dividing the data into a plurality of parts and for transmitting an access request consisting of a plurality of access packets, each packet including one part of the payload data and in that the primary station has means for determining that a received access request comprises a plurality of access packets and means for combining the payload data from the plurality of access packets.

According to a second aspect of the present invention there is provided a primary station for use in a radio communication system having a random access channel for transmission of an access request by a secondary station to the primary station, which access request comprises an access packet having a predetermined maximum data capacity, wherein means are provided for determining that a received access request comprises a plurality of access packets and for combining the payload data from the plurality of access packets.

According to a third aspect of the present invention there is provided a secondary station for use in a radio communication system having a random access channel for transmission of an access request by the secondary station to a primary station, which access request comprises an access packet having a predetermined maximum data capacity, wherein the secondary station comprises means responsive to determining that the secondary station requires to transmit an access request including more payload data than can be accommodated in the format of a single access packet for dividing the data into a plurality of parts and for transmitting an access request consisting of a plurality of access packets, each packet including one part of the payload data.

According to a fourth aspect of the present invention there is provided a method of operating a radio communication system, the system comprising a primary station and a plurality of secondary stations and having a random access channel for transmission of an access request by a secondary station to a primary station, which access request comprises an access packet having a predetermined maximum data capacity, wherein a secondary station which requires to transmit an access request including more payload data than can be accommodated in the format of a single access packet divides the data into a plurality of parts and transmits an access request consisting of a plurality of access packets, each packet including one part of the payload data, and the primary station determines that a received access request comprises a plurality of access packets and combines the payload data from the plurality of access packets.

Embodiments of the present invention will now be described, by way of example, with reference to the accompanying drawings, wherein.

Figure 1:
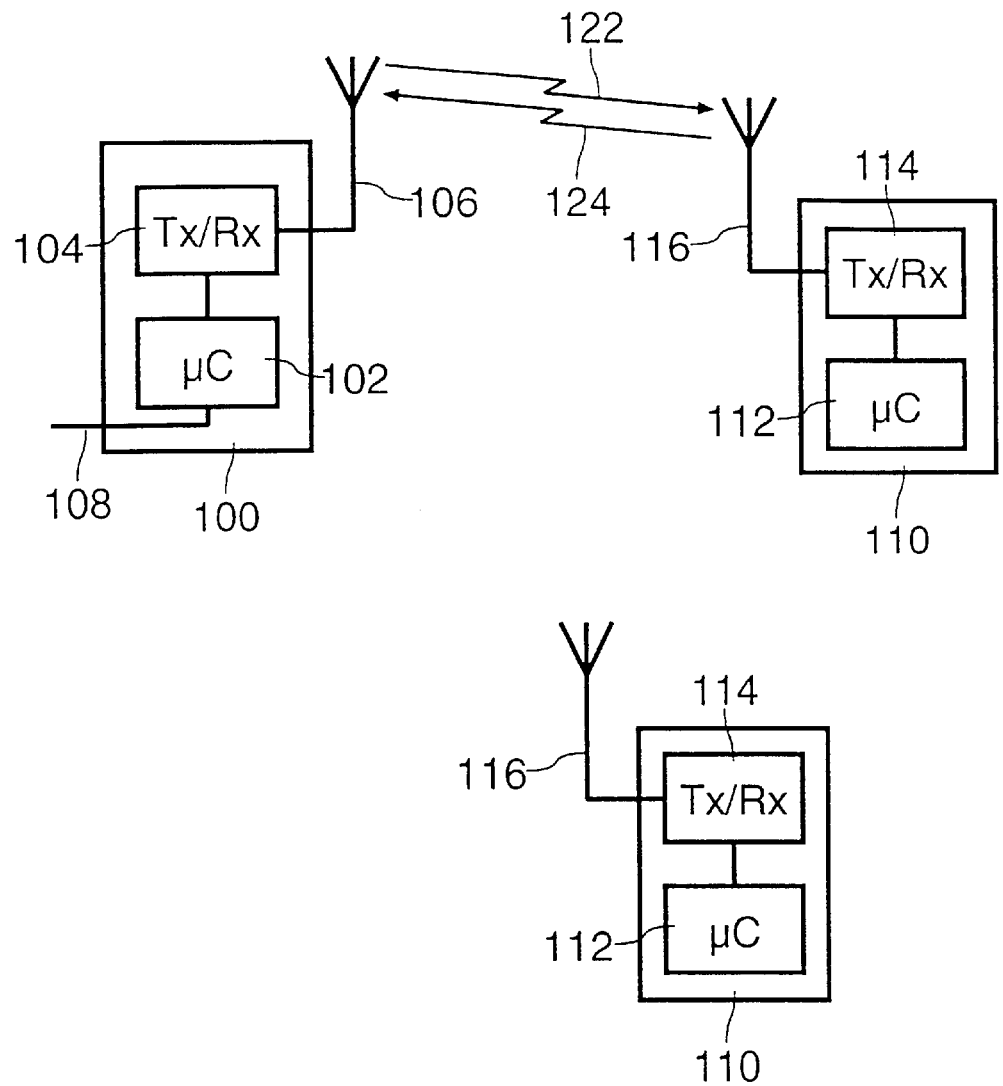
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller ($\mu$C) 102, transceiver means 104 connected to radio transmission means 106, and connection means 108 for connection to the PSTN or other suitable network. Each MS 110 comprises a microcontroller ($\mu$C) 112 and transceiver means 114 connected to radio transmission means 116. Communication from BS 100 to MS 110 takes place on a downlink channel 122, while communication from MS 110 to BS 100 takes place on an uplink channel 124.

The present invention is concerned with a random access uplink channel 124 for transmission of access requests by a MS 110. Embodiments will be described in relation to a Time Division Duplex (TDD) UMTS system employing Code Division Multiple Access (CDMA) techniques, although the techniques described are equally applicable to other systems having a TDMA random access channel, whether or not they use CDMA and TDD techniques. For example, a similar scheme could also be applied to a Frequency Division Duplex (FDD) UMTS system even though the details of the frame structure differ between FDD and TDD modes of UMTS.

Figure 2:
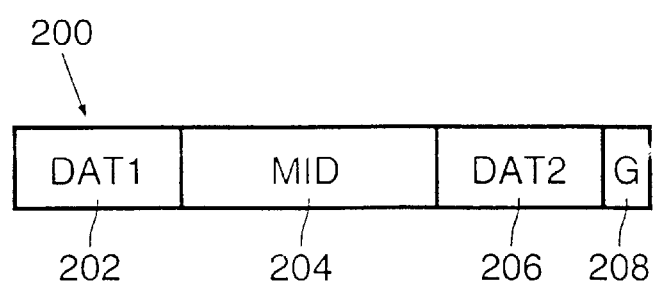
FIG. 2 is illustrates one possible format for a access packet.

In particular, the present invention is concerned with a system in which an access request transmitted by the MS 110 comprises an access packet of a predetermined format transmitted in a time slot of a predetermined duration. An example of such a system is the random access channel in the TDD mode of UMTS. The format of an access packet in this system is shown in FIG. 2. The total duration of an access packet is 312.5$\mu$s (1280 chips), which is half of the duration of a full time slot in this system. The access packet 200 consists of a first data section (DAT1) 202, of 336 chips, a mid-amble section (MID) 204, of 512 chips, a second data section (DAT2) 206, of 336 chips, and a guard period (G), of 96 chips.

The access packet 200 is encoded using one of a number of possible spreading codes, selected at random by the MS 110, to enable several access requests to be sent simultaneously. The purpose of the mid-amble section 204 is to enable the BS 100 to obtain an accurate channel estimation, even for a worst-case channel, so that the payload contained in the data sections 202, 206 can be received without errors. The mid-amble section 204 also enables joint detection of access packets 200 transmitted simultaneously but with different spreading codes.

With a spreading factor of 16, each of the data sections 202, 206 can accommodate 21 symbols (42 bits if Quadrature Phase Shift Keying (QPSK) modulation is used). A known problem is that this data capacity may be insufficient for initial access by a MS 110. However, other access requests may require a smaller payload. Various possibilities have been considered for increasing the payload:

The size of the mid-amble 204 could be reduced to 256 chips. However this would degrade performance in channels having a large delay spread, and the increase in payload of 256 chips (16 symbols) may not be sufficient.

The spreading factor for the data sections 202, 206 could be reduced, for example from 16 to 8. This would double the payload size, but reduce the maximum number of simultaneous access requests, and therefore the overall capacity of the random access channel.

The length of an access packet 200 could be doubled to that of a full time slot. However, this would reduce the number of slots available, thereby increasing the probability of collisions, and reduce the overall capacity of the random access channel.

In a system in accordance with the present invention, the problem is solved by permitting the MS 110 to split the transmission of its payload between a plurality of access packets 200 if the payload is larger than can be accommodated in a single access packet 200. Such a system has a significant advantage over the other possible solutions identified above when the majority of the access requests require only a single access packet 200 to be transmitted.

The system could limit the number of access packets 200 forming an access request, for example to two if this would always provide sufficient payload capacity. The system might also require, for convenience, that the plurality of access packets 200 are transmitted with a particular relationship to one another. For example, the access packets could be required to be transmitted in successive time slots or with a predetermined number of time slots between each packet, and it could also be required that the same spreading code is applied by the MS 110 to each of the access packets 200. Alternatively it could be required that the plurality of access packets 200 are transmitted simultaneously, each using a different spreading code.

The data sections 202, 206 of an access packet 200 need to incorporate some signalling to indicate whether the access packet 200 is a complete access request in itself or is part of an access request formed of a plurality of access packets 200, the payload data of which is to be combined by the BS 100. Use of the same spreading code for each of the plurality of access packets would facilitate this identification.

The format of the payload data in each of the plurality of access packets 200 need not be the same. For example, the first access packet 200 could contain signalling information, indicating the identity of the transmitting MS 110 and the total number of access packets being transmitted. One of the access packets 200 could contain a Cyclic Redundancy Check (CRC), or other data integrity check, for the complete payload data. The complete payload data could be interleaved between the plurality of access packets 200 for improved error performance.

Figure 3:
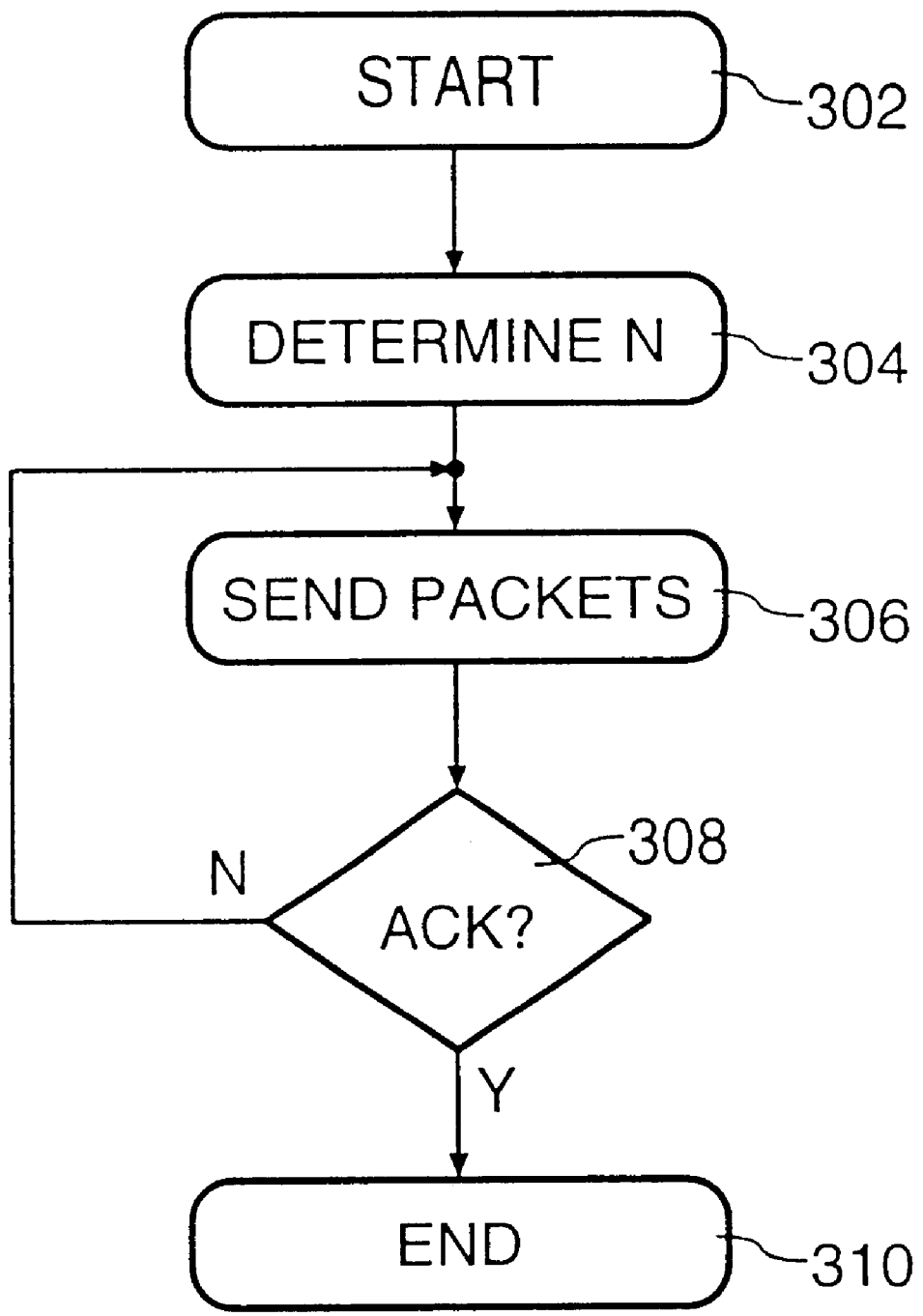
FIG. 3 is a flow chart illustrating a method in accordance with the present invention for transmitting on a random access channel.

A method of transmitting on a random access channel in accordance with the present invention is shown in the flow chart of FIG. 3. The method starts, at 302, when a MS 110 needs to request a service from, or transmit a short message to, a BS 100. The MS 110 determines, at 304, how much payload data it requires to transmit, and therefore the number N of access packets 200 required to accommodate this data. The MS 110 then generates an appropriate number of access packets 200, chooses a spreading code to encode them and transmits them, at 306, on the random access channel to the BS 100.

The MS 110 then waits, at 308, for the BS 100 to issue an acknowledgement of the request, for example on a common downlink signalling channel. If no acknowledgement is received within a predetermined period, the MS 110 retransmits the N access packets 200. The method ends with the successful receipt of an acknowledgement, at 310, after which the MS 110 and BS 100 take whatever action is necessary to initiate the requested service or deal with the message.

The BS 100 could issue a separate acknowledgement for each access packet 200, so that if one or more of the plurality of access packets transmitted by a MS 110 is (or are) corrupted it only needs to retransmit those packets received with errors. However, it is simpler for the BS 100 to issue a single acknowledgement for the complete access request and this also provides a more consistent interface to higher protocol layers (which are not concerned with the number of access packets needed to transmit a particular access request).

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A method of operating a radio communication system having a first random access channel, comprising:
   determining that a mobile station needs to communicate with a base station;
   determining an amount of payload data that is required to be communicated to the base station in an initial access request, the access request comprising one or more access packets and configured to initiate access by the mobile station to the base station;
   determining a number of access packets required to communicate the amount of payload data in the access request based on the amount of payload data and a predetermined maximum length of the access packets;
   generating the number of access packets;
   selecting at least one spreading code and encoding the access packets with the at least one spreading code;
   transmitting the encoded access packets on the first random access channel; and
   determining whether an acknowledgement has been received from the base station within a predetermined time period, the acknowledgement indicating that the access packets have been successfully received by the base station;
   wherein if the number of access packets in the access request is greater than one, including indicia in at least one of the access packets to indicate to the base station that the access request comprises a plurality of access packets; and
   wherein the access packets are transmitted in a predetermined timing relationship with respect to each other, at least one of the access packets containing integrity check data, and each access packet comprises a first data section, a mid-amble section, and second data section.

2. The method of claim 1, wherein each access packet is encoded with the same spreading code.

3. The method of claim 1, wherein the at least one spreading code is randomly selected from a set of predetermined spreading codes.

4. The method of claim 3, wherein each access packet is encoded with a different spreading code.

5. The method of claim 1, wherein the acknowledgement is a single packet indicating that all the access packets, which include the payload data transmitted, have been received successfully by the base station.

6. The method of claim 1, wherein the predetermined timing relationship requires that the access packets be transmitted in successive time slots.

7. The method of claim 1, wherein the predetermined timing relationship requires that the access packets be transmitted with a predetermined number of time slots between each access packet.

8. The method of claim 1, wherein the access packets are transmitted simultaneously, each access packet having been spread with a different spreading code.

9. The method of claim 8, wherein the mid-amble is configured such that the base station is enabled to jointly detect the access packets that have been transmitted simultaneously, each access packet having been spread with a different spreading code.

10. The method of claim 1, wherein the mid-amble is configured to enable the base station to obtain an accurate channel estimation, such that the payload contained in the first data section and the second data section of each access packet can be received without errors.

11. The method of claim 1, further comprising:
    retransmitting the access packets if the acknowledgement is not received within the predetermined time period.

12. The method of claim 1, wherein signaling information is included in only one of the number of access packets, the signaling information indicating whether the access request comprises a single access packet or a plurality of access packets.

13. A mobile station for use in a radio communication system having a random access channel, comprising:
    means for determining that the mobile station needs to communicate with a base station;
    means for determining an amount of payload data that is required to be communicated to the base station in an initial access request, the access request comprising one or more access packets and configured to enable access by the mobile station to the base station;
    means for determining a number of access packets required to communicate the amount of payload data in the access request based on the amount of payload data and a predetermined maximum length of the access packets;
    means for generating the number of access packets;
    means for selecting at least one spreading code and encoding the access packets with the at least one spreading code;
    means for transmitting the encoded access packets on the first random access channel; and
    means for determining whether an acknowledgement has been received from the base station within a predetermined time period, the acknowledgement indicating that the access packets have been successfully received by the base station;
    wherein the means for generating the access packets includes means for including indicia in at least one of the access packets to indicate to the base station that the access request comprises a plurality of access packets, if the number of access packets is greater than one; and
    wherein the access packets are transmitted in a predetermined timing relationship with respect to each other, at least one of the access packets containing integrity check data, and each access packet comprises a first data section, a mid-amble section, and second data section.

14. The mobile station of claim 13, further comprising means for transmitting the access packets if the acknowledgement is not received with the predetermined time period.

15. The mobile station of claim 13, wherein the means for selecting at least one spreading code comprises means for randomly selecting the at least one spreading code from a predetermined set of spreading codes.

16. The mobile station of claim 14, further comprising means for transmitting the access packets in successive time slots.

17. The mobile station of claim 14, further comprising means for transmitting the access packets with a predetermined number of time slots between each access packet.

18. The mobile station of claim 14, further comprising means for including a data integrity check in only one of the number of access packets.

* * * * *